(12) United States Patent
Cox et al.

(10) Patent No.: US 8,712,603 B2
(45) Date of Patent: Apr. 29, 2014

(54) AIRCRAFT DRIVE

(75) Inventors: Isaiah Watas Cox, Baltimore, MD (US); Robert Lincoln Carman, Jr., Thousand Oaks, CA (US)

(73) Assignee: Borealis Technical Limited (GI)

( * ) Notice: Subject to any disclaimer, the term of this patent is extended or adjusted under 35 U.S.C. 154(b) by 1650 days.

(21) Appl. No.: 11/660,569

(22) PCT Filed: Aug. 2, 2005

(86) PCT No.: PCT/US2005/027559
§ 371 (c)(1),
(2), (4) Date: Aug. 20, 2007

(87) PCT Pub. No.: WO2006/078322
PCT Pub. Date: Jul. 27, 2006

(65) Prior Publication Data
US 2007/0282491 A1    Dec. 6, 2007

Related U.S. Application Data

(60) Provisional application No. 60/602,359, filed on Aug. 17, 2004, provisional application No. 60/605,284, filed on Aug. 26, 2004.

(51) Int. Cl.
*G01C 23/00* (2006.01)
*G05D 1/00* (2006.01)
*G06F 7/00* (2006.01)

(52) U.S. Cl.
USPC ........................................ 701/3; 701/1; 701/7

(58) Field of Classification Search
None
See application file for complete search history.

(56) References Cited

U.S. PATENT DOCUMENTS

| | | | | |
|---|---|---|---|---|
| 2,320,547 | A | | 6/1943 | Tiger |
| 2,460,387 | A | | 2/1949 | Hunter |
| 2,631,476 | A | | 3/1953 | Ravigneaux |
| 2,687,857 | A | | 8/1954 | Caldwell et al. |
| 2,814,452 | A | * | 11/1957 | Blanchard et al. ............. 244/50 |
| 3,088,699 | A | | 5/1963 | Larson |
| 3,109,324 | A | | 11/1963 | Locher |
| 3,711,043 | A | | 1/1973 | Cameron-Johnson |
| 3,762,670 | A | * | 10/1973 | Chillson ......................... 244/50 |
| 3,764,094 | A | | 10/1973 | Cross |
| 3,807,664 | A | * | 4/1974 | Kelly et al. ..................... 244/50 |
| 3,850,389 | A | | 11/1974 | Dixon |
| 3,874,618 | A | | 4/1975 | Bates |
| 3,874,619 | A | * | 4/1975 | Collins et al. .................. 244/50 |
| 3,977,631 | A | | 8/1976 | Jenny |
| 4,008,868 | A | * | 2/1977 | Berg ............................. 244/111 |
| 4,078,845 | A | * | 3/1978 | Amberg et al. ............... 303/164 |
| 4,659,039 | A | * | 4/1987 | Valdes ....................... 244/103 S |
| 5,086,994 | A | | 2/1992 | Donnelly et al. |
| 5,104,063 | A | * | 4/1992 | Hartley ...................... 244/103 S |
| 5,513,821 | A | * | 5/1996 | Ralph ............................. 244/50 |

(Continued)

FOREIGN PATENT DOCUMENTS

| | | |
|---|---|---|
| EP | 0756556 B1 | 9/1999 |
| WO | WO-2005/035358 A2 | 4/2005 |
| WO | WO-2006/002207 A2 | 1/2006 |
| WO | WO-2006/065988 A2 | 6/2006 |

*Primary Examiner* — Bhavesh V Amin

(57) ABSTRACT

The present invention describes a drive system for an aircraft involving one or more nose wheel motors. Data regarding the nose wheel rotation is used to control the ground travel of the aircraft, to predict potential problems, to provide more precise control over the aircraft, and to improve aircraft safety.

25 Claims, 3 Drawing Sheets

A - Axle
B - Motor stator
C - Motor external rotor
D - Compound planet gear
F - Lockable sun gear
G - Sun gear locking, ratcheting system
H - Wheel w/sun gear

(56) References Cited

U.S. PATENT DOCUMENTS

| | | | |
|---|---|---|---|
| 5,875,994 A | 3/1999 | McCrory | |
| 5,918,951 A * | 7/1999 | Rudd, III | 303/150 |
| 6,198,238 B1 * | 3/2001 | Edelson | 318/148 |
| 6,241,325 B1 * | 6/2001 | Gowan et al. | 303/176 |
| 6,390,571 B1 * | 5/2002 | Murphy | 303/126 |
| 6,402,259 B2 * | 6/2002 | Corio et al. | 303/20 |
| 6,411,890 B1 | 6/2002 | Zimmerman | |
| 6,471,015 B1 * | 10/2002 | Ralea et al. | 188/1.11 L |
| 6,513,885 B1 * | 2/2003 | Salamat et al. | 303/122.09 |
| 6,619,584 B1 * | 9/2003 | Haynes | 244/2 |
| 6,657,334 B1 | 12/2003 | Edelson | |
| 6,690,295 B1 | 2/2004 | De Boer | |
| 6,704,634 B1 * | 3/2004 | Gowan et al. | 701/70 |
| 6,820,946 B2 * | 11/2004 | Salamat et al. | 303/122.09 |
| 6,838,791 B2 | 1/2005 | Edelson | |
| 6,922,037 B2 | 7/2005 | Edelson | |
| 6,928,363 B2 * | 8/2005 | Sankrithi | 701/120 |
| 7,237,748 B2 * | 7/2007 | Sullivan | 244/111 |
| 7,275,715 B2 * | 10/2007 | McCoskey et al. | 244/118.1 |
| 7,281,684 B2 * | 10/2007 | Steiner et al. | 244/111 |
| 7,445,178 B2 * | 11/2008 | McCoskey et al. | 244/50 |
| 7,614,585 B2 * | 11/2009 | McCoskey et al. | 244/137.1 |
| 7,891,609 B2 * | 2/2011 | Cox et al. | 244/121 |
| 7,980,509 B2 * | 7/2011 | Bhargava | 244/50 |
| 2004/0059497 A1 * | 3/2004 | Sankrithi | 701/120 |
| 2004/0220714 A1 * | 11/2004 | Rudd, III | 701/71 |
| 2005/0253020 A1 | 11/2005 | McCoskey et al. | |
| 2005/0253021 A1 | 11/2005 | McCoskey et al. | |
| 2006/0038068 A1 * | 2/2006 | Sullivan | 244/111 |
| 2006/0065779 A1 | 3/2006 | McCoskey et al. | |
| 2007/0282491 A1 * | 12/2007 | Cox et al. | 701/3 |
| 2008/0179146 A1 * | 7/2008 | Sullivan | 188/164 |
| 2008/0203217 A1 * | 8/2008 | Frank | 244/50 |
| 2009/0261197 A1 * | 10/2009 | Cox et al. | 244/50 |
| 2010/0006699 A1 * | 1/2010 | Sullivan | 244/111 |

* cited by examiner

A - Axle
B - Motor stator
C - Motor external rotor
D - Compound planet gear
F - Lockable sun gear
G - Sun gear locking, ratcheting system
H - Wheel w/sun gear

AIRCRAFT DRIVE

CROSS-REFERENCE TO RELATED APPLICATIONS

This application is the U.S. national stage application of International Application No. PCT/US2005/027559, filed Aug. 2, 2005, which international application was published on Jul. 27, 2006, as International Publication WO2006/078322 in the English language. The International Application claims the benefit of Provisional Patent Application No. 60/602,359, filed Aug. 17, 2004, and of Provisional Patent Application No. 60/605,284, filed Aug. 26, 2004, both of which are incorporated herein by reference in their entirety.

TECHNICAL FIELD

The present invention relates to motors located within the nose wheel of an aircraft, and the use of motor speed sensors attached to the nose wheel motor.

BACKGROUND ART

The use of small compact electric motors inside, or in close proximity to, an aircraft wheel, for direct drive, presents a problem relating to the provision of the required amounts of torque. Generally, for moving an aircraft from rest, the torque required is extremely high, so that the torque versus speed characteristics of the load, and the maximum speed characteristics of the load when driven, fall well outside the ideal predicted by motor scaling laws. This means that a motor sized to produce the torque necessary for direct drive of the load will be operating at well below maximum speed, and thus well below maximum power levels. The active materials of the machine will be underutilized, the machine will be far heavier than necessary, and the machine efficiency will be poor.

Gearing can provide a higher speed, lower torque motor with a higher torque option to enable a motor to be housed within a wheel. The wheel itself is expected to operate during takeoff and landing at much higher than normal motoring speeds. This presents a significant problem, because, in these cases, the wheels may be rotating faster than the motor and may accelerate the motor via the gearing system. Under these conditions, the motor would be forced to spin at much higher speeds than rated.

U.S. Pat. No. 3,711,043 to Cameron-Johnson discloses an aircraft drive wheel having a fluid-pressure-operated motor housed within the wheel and two planetary gear stages housed in a gear box outboard of the motor, the final drive being transmitted from a ring gear of the second gear stage, which is inboard of the first stage, to the wheel through an output drive quill coupled, through a disc-type clutch if desired, to a flanged final drive member bolted to the wheel.

U.S. Pat. No. 3,977,631 to Jenny discloses a wheel drive motor selectively coupled to an aircraft wheel through a rotatably mounted aircraft brake assembly in order to drive the wheels of an aircraft. The normally non-rotating stator portion of a conventional aircraft brake assembly is rotatably mounted about the wheel axle and is rotatably driven through a planetary gear system by the wheel drive motor.

A solution disclosed in PCT application WO2005/035358 discloses a mesh connected high phase order induction motor, situated in close proximity to, and preferably within, the nosegear. The mesh connection enables variable inductance so that the machine has a range of speed/torque profiles available.

Various guidance systems for aircraft taxi are disclosed in the art. The degree of automation in taxiing may vary.

U.S. Pat. No. 6,411,890 to Zimmerman discloses a method for the guidance of aircraft on the taxiways of the airport apron with position lights located on the taxiways and, possibly, other locations on the apron. It comprises the following components: a navigation system to determine the current aircraft position; a sensor on the aircraft to detect position and measure lights, reference information including light positions, a comparison of the path pursued by the navigation system with the reference information, and using the detected lights as waypoints for the navigation system. The method determines the current aircraft position more precisely than purely through the navigation system, and generates guidance information based on the determined aircraft position. The invention further discloses an additional sensor for the detection of lights and their position measurement. The latter should be performed with a precision of approx. 10 cm. Video cameras and scanners, for example which can be advantageously arranged on the aircraft main landing gear, are suited for this task.

U.S. Pat. No. 6,690,295 to De Boer teaches a device for determining the position of an aircraft at an airport, including sensors for detecting radio signals originating from a vehicle. The sensors are positioned at regular intervals from one another on parts of the airport which are accessible to the vehicle. The sensors are fitted in light positions of runway lighting provided at the airport on taxiways, take-off and landing runways and on platforms. The signal originating from a radio altimeter of an aircraft is used as the radio signal. Data communication takes place from the sensors via power supply lines of the light points. A central processing device is provided with warning means to generate a warning if the detected position of the vehicle is outside a predefined area at the airport which is permitted to the vehicle.

A sophisticated control system is utilized in a Space Shuttle Orbiter vehicle. The vehicle uses a conventional type of landing system having an aircraft tricycle configuration consisting of a nose landing gear and a left and right main landing gear. The nose landing gear is located in the lower forward fuselage, and the main landing gear is located in the lower left and right wing area adjacent to the mid-fuselage. The nose wheel is equipped with a ground proximity sensor, in order to determine Weight on Nosegear (WONG), a parameter required during landing. After landing, when WONG and other safety parameters have been established, Nose Wheel Steering (NWS) is enabled. One or more steering position transducers on the nose wheel strut transmit nose wheel steering position feedback to a comparison network so that the nose wheel commanded and actual positions may be compared for position error.

Braking is accomplished by a sophisticated system that uses electrohydraulic disk brakes with an anti-skid system. Only the two main gear sets have braking capability, and each can be operated separately. Two primary steering options are available. By applying variable pressure to the brakes, the crew can steer the vehicle by a method called differential braking. Also, by selecting nose wheel steering, the crew can use the rudder pedal assembly to operate an hydraulic steering actuator incorporated in the nose landing gear. The crew can also use the rudder to assist steering while at higher ground speeds.

Each main landing gear wheel has two speed sensors that supply wheel rotational velocity information to the skid control circuits in the brake/skid control boxes. The velocity of each wheel is continuously compared to the average wheel velocity of all four wheels. Whenever the wheel velocity of one wheel is a predetermined percentage below the average velocity of the four wheels, skid control removes brake pressure from the slow wheel until the velocity of that wheel increases to an acceptable range.

DISCLOSURE OF INVENTION

From the foregoing, it may be appreciated that a need has arisen for enhanced guidance information for an aircraft using nose wheel motors. Data including speed, torque and temperature measurements taken from the nose wheel is accumulated. The data is used in one or more of a number of aircraft navigation functions.

In a further aspect, the invention is directed to an aircraft that has at least one onboard motor for powering taxi operations. Preferably, a motor is housed within each nose wheel. A data collector is attached to the nosegear to collect data from the nose wheels, including at least speed and torque. The data collector transfers the data to a central processing unit that processes the data. A guidance system has an output to present the processed data in a way that guides taxi operations. In a preferred aspect, the data processor contains a data compare that has means to compare between the rotational data of each nose wheel, and means to determine the rate of change of the rotational data of each nose wheel. In a further preferred aspect, the data compare compares the collected rotational data with data from other sources such as: main gear measured speed, GPS, radar, radio transponders, airport maps, airport lighting, nose wheel steering position, main gear angle, aircraft weight, a speedometer measuring the rotational speed of the main gear, Laser Doppler velocimeters, aircraft position, video cameras, and airspeed. In particular, the data can be used to provide guidance for steering, for safe turn rates, and for safe turn angles.

The benefits of two separately driven nose wheels with speed and torque sensors include improved performance, additional precision in guiding an aircraft, and preventing an aircraft from overbalancing.

The range of outputs that the guidance system provides depends on the application, and may aid manual, semi-automatic or automatic steering. In a further aspect, the invention includes a method for moving an aircraft on the ground, including the steps of: a) providing an onboard motor to drive the aircraft wheels, b) measuring speed of each of two nose wheels of the aircraft, and c) providing an output displaying the measured torque and/or speed of each of the two nose wheels, and d) providing a user input for selecting a required a path and speeds for the aircraft, such as a pilot interface or an automatic program, and e) driving the aircraft according to the selected path and speeds with reference to the displayed speed and/or torque of the nose wheels, by: electrically powering the motor to drive the wheels forward for forward taxi, and providing a torque differential between the nose wheels for steering.

In a further aspect, the invention includes a method of turning the nosegear of an aircraft by providing two motors each housed in a nose wheel, and energizing the motors with a differential force between them. To protect against overbalancing, the following steps are followed: determining the speed differential between the two nose wheels, comparing the speed differential with safe differential limits, warning against or preventing the differential limits from being exceeded.

BRIEF DESCRIPTION OF DRAWINGS

For a more complete explanation of the present invention and the technical advantages thereof, reference is now made to the following description and the accompanying drawings, in which.

BEST MODE FOR CARRYING OUT THE INVENTION

Embodiments of the present invention and their technical advantages may be better understood by referring to FIGS. 1-5.

Figure 1:
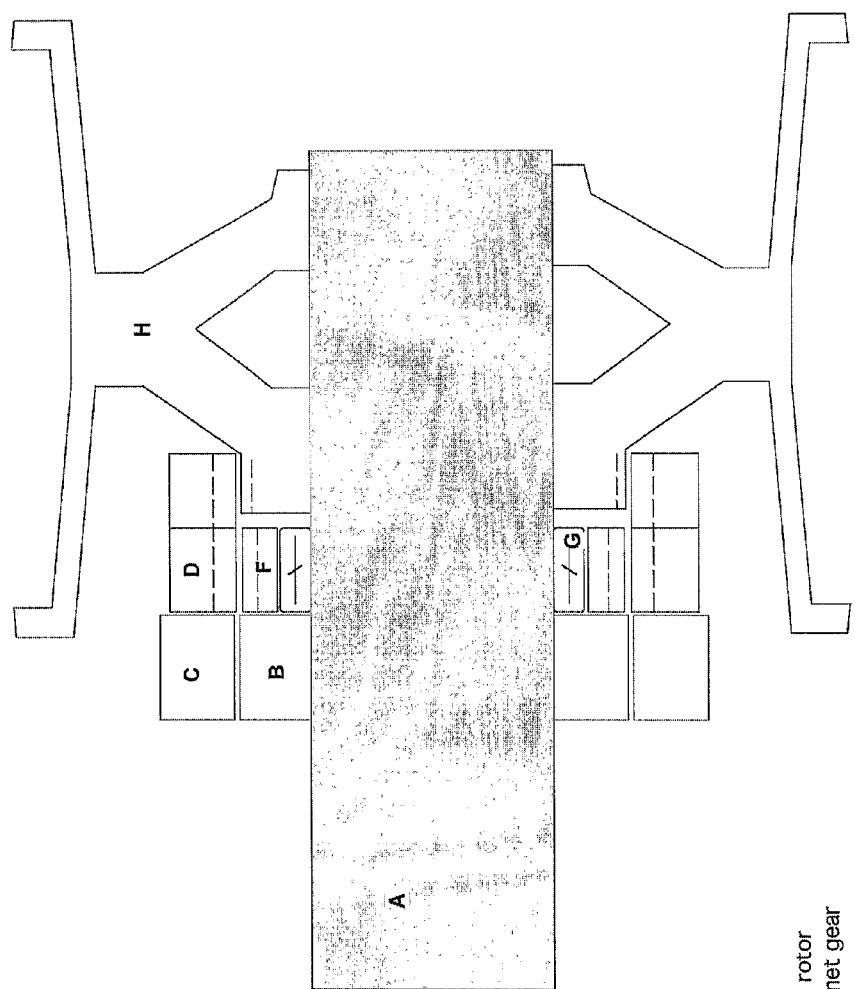
FIG. 1 shows a nose wheel, and motor and gearing contained within.

In the present invention, an aircraft nose wheel is motor driven. FIG. 1 shows one way in which a motor may be housed in the wheel and connected through a gearing system to the wheel. A motor, including stator B and rotor C, is mounted around a central axle, A, (labeled only on one side). The gearing system includes gear parts D, F, G and H, which are not an intrinsic part of the present invention. The output of rotor C is applied to the gear system, and gear H transmits the rotary power to the wheel. This example represents one way in which the motor may be housed within the wheel itself. Depending on the number of motors and their operating ranges, gearing may or may not be required.

In the present invention, one or more motors power the nosegear. In a preferred embodiment each wheel of the nosegear houses an independently driven motor. The motor or motors may serve to push or pull an aircraft on the ground, in a forward or reverse direction, pre-rotate aircraft wheels before landing, and, where there is more than one independently driven motor, the motors may be driven with a power differential in order to turn the aircraft on the ground.

Figure 2:
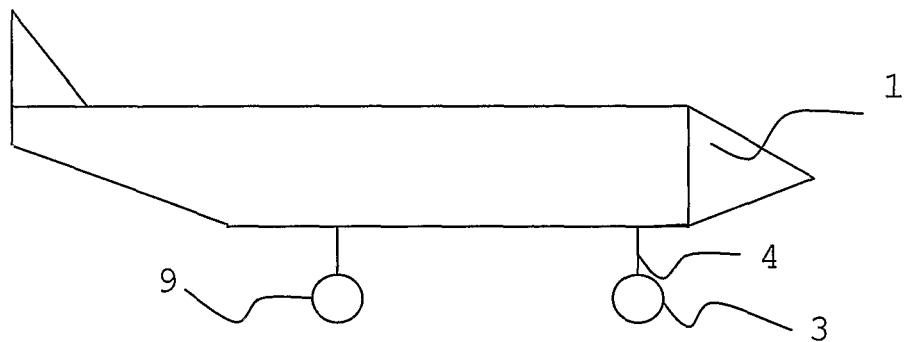
FIG. 2 shows a flow chart concerning electrical signal flow through the aircraft.

FIG. 2 shows a simplified side view of typical landing gear. Aircraft 1 has two sets of wheels, main gear 9 and nosegear 3. Nosegear 3 is connected via strut 4 to airplane 1, usually with one wheel on either side of strut 4.

Figure 3:
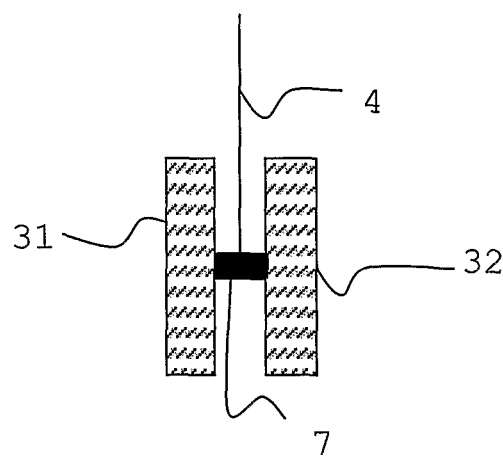
FIG. 3 shows a simplified view of an aircraft side, showing the position of the nose wheels.

FIG. 3 shows a simplified frontal view of the nosegear. Strut 4 supports nose wheels 31 and 32, via axle 7.

Figure 4:
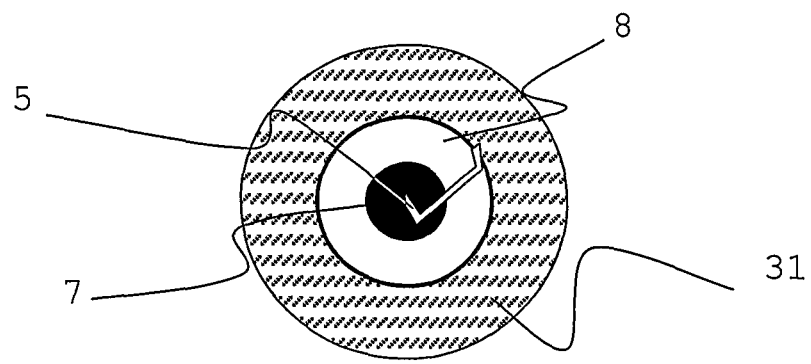
FIG. 4 shows a frontal view of the nose wheels.

Data concerning the rotational speed of the one or two of the motors inside the nosegear is made available to the aircraft data bus and is used to help guide the aircraft. FIG. 4 shows one way in which this may be done. Data is collected by sensors 5 near a motor 8 that measure the speed of wheel 31. Data is communicated to a central processing unit through axle 7, which is hollow. In a further embodiment, data is communicated remotely, through radio waves or the like. Further useful information that may be measured is motor speed or torque, temperature and slip, gear ratio, wheel torque and temperature etc. Preferably, these values are independently measured for each nose wheel.

In a further aspect, electrical data may be collected directly from the motors, with or without the use of a sensor. The speed data collected from the motors includes normal motor feedback, such as energizing the motor, and then determining rotational speed. Alternatively, more complex sensors and feedback content may be used. The invention is not limited to any particular number or type of data collectors, sensors, measuring devices or feedback mechanisms. The generic term "data collectors" is used to include any collector of data known in the art.

The data is appropriately scaled, and used separately or collectively to create a picture of the forces involved and to guide the aircraft.

Figure 5:
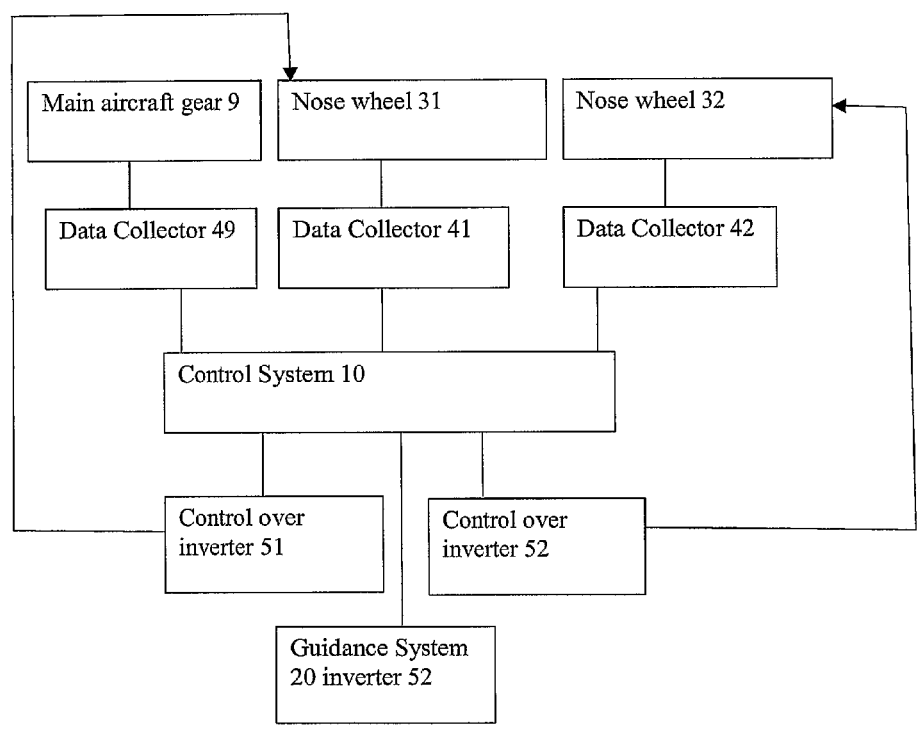
FIG. 5 shows a simplified view showing the position of the sensors with regard to the nose wheel, motor and feedback channels.

In FIG. 5, the data flow is shown. Main aircraft gear 9 is equipped with a main gear data collector 49, nose wheel 31 is equipped with first data collector 41, and nose wheel 32 is equipped with second data collector 42. Data from data collectors 49, 41 and 42 is sent to central processing unit 10. Central processing unit 10 scales the data as necessary. Central processing unit 10 also includes a data compare that uses conventional compare algorithms to compare the data from the two nose wheels with each other. The data compare preferably also compares inputs from other data sources and may also compare the rate of change of each input. The output from the data compare is sent to guidance system 20. Guidance system 20 uses the output from the data compare for guiding the ground travel of the aircraft. For manual taxi, (not shown) guidance system 20 may use the information to provide the pilot with real time measurements and may also provide suggestions, information and warnings. For automatic taxi, guidance system 20 sends commands to motor commanders 51 and 52. Motor commander 51 operates the motor of nose wheel 31 and motor commander 52 operates the motor of nose wheel 32.

As mentioned, preferably central processing unit 10 also compares the collected nose wheel data with collected applicable data from other sources. Other data sources include main gear measured speed, GPS, radar, radio transponders, airport maps, airport lighting, nose wheel steering position, main gear angle, aircraft weight, a speedometer measuring the rotational speed of the main gear, Laser Doppler velocimeters, airspeed, aircraft position, video cameras, etc. The information is then provided to the guidance system.

The guidance system should also have a user input to be able to take commands from the pilot.

In different aspects of the present invention, the data collected from the nosegear is applicable to manual, semi-automatic and automatic taxiing. The nosegear data may be used in isolation, or in combination with other guidance data.

For example, with manual taxi, audio or optical output is provided to the pilot, to guide him or her. In one aspect of the present invention, the pilot is provided with a digital display showing the speed, torque and temperature of each of the nose wheel motors. In further aspects, the guidance system is designed to guide ground steering operations within defined safety parameters. As such, the pilot may be supplied with emergency warnings, in the form of digital display, lights, audible warnings, etc. The guidance system additionally may be set to provide a pilot override in which a user input from the pilot is ignored if it does not lie within safety parameters. The software may have other methods of preventing a pilot from executing a dangerous action. For example, the guidance system may reset the range of a pilot's input command unit, such as the joystick.

With semi-automatic and automatic taxi, a user input is provided for selecting a desired path, and speeds for the aircraft to follow. The rotational data of each of two nose wheels is measured, and an output is provided, displaying for the guidance system the measured torque, speed and temperature of each of the two nose wheels. According to applications, all three or fewer of these measurements are taken, either off the wheels or directly off the motors. The measured data may also be displayed to the pilot. The guidance system drives the aircraft according to the selected path and speeds, referencing the measured rotational data of the nose wheels. The guidance system provides forward taxi by electrically powering the motor to drive the wheels forward, braking by stopping both wheels, reversing by driving both wheels backwards, and steering by providing a speed differential between the wheels.

With semi-automatic taxi, information is provided for the automatic nose landing gear steering, combined with information for the audio or optical output to the pilot for manual longitudinal guidance (accelerating, braking). For automatic taxi, information is provided for automatic nose landing gear steering as well as for automatic longitudinal aircraft guidance (accelerating, braking). For automatic and semi-automatic taxi, the system should have built in logic for applying corrective action during unexpected uneven drive conditions.

The present invention pertains to all types of taxiing, including combinations of the above.

In the present invention, the guidance system may use the collected data in a number of ways, a few of which are as follows:

1) One way in which the data collection from the nose wheels is beneficially used is data redundancy. It is beneficial to have various sources of data in case one instrument is currently not functioning properly. This also enables error detection, providing evidence of the malfunctioning instrument. Malfunctioning instruments include inaccurate data collectors, data transmitters, display units, as well as jammed wheels or damaged motors.

2) Another use of the nose wheel sensors and data collection is for effective steering.

There are various methods by which steering an aircraft may be performed. Steering an aircraft is commonly performed mechanically with differential braking. Brakes are applied to the wheels on the side of the aircraft in which it is desired to turn. The stationary or slower moving wheel acts as a fulcrum for the aircraft to move round. In the present invention, instead of using brakes, one can provide the nose wheel motors with an electrical power differential to cause the aircraft to turn. Instead of mechanically stopping one of the wheels, one may use electrical motor steering. The motor commander causes one of the wheel motors to slow. The motor commander may produce a stopping torque, a slowing torque, or a reverse torque.

However braking one wheel sometimes has the effect of slowing the aircraft considerably. A benefit of motor steering, is that one may simultaneously increase the speed of the outer wheel and decrease the speed of the inner wheel. The aircraft follows a gradually circular arc while maintaining a steady speed. The wheel speeds and torques are selected based on how wide a turn it is desired to make.

A further aspect of the present invention includes geared steering. This is a method of steering done by changing the speed/torque gear ratio of one or both of the nose wheels. For example, driving the left wheel with a low speed/torque ratio and the right wheel with a higher speed/torque ratio would result in the left wheel turning more slowly, and a left turn. If the gear ratios are not even multiples, a great number of turning radii can be achieved. Geared steering may require considerable driver skill, but the method is efficient and may be used by an automatic pilot system.

Geared steering may be performed with mechanical gears between the motor and the wheels. However, if the motor is a high phase order mesh-connected motor, a speed/torque ratio change may be electrically performed. This is done by providing a drive waveform and varying the harmonic content of the drive waveform. The mesh-connection of the windings permits the variable harmonic content to vary the Volts/Hertz ratio of the motor. This changes the speed/torque ratio of the motor. Varying a Volts/Hertz machine ratio is described in detail in my U.S. Pat. No. 6,657,334. Geared steering may also be done in combination with motor steering, described above.

The invention is not limited to any type of steering. Any steering method known in the art may be used instead of in combination with the methods described.

As mentioned, for effective steering, feedback data from the nose wheels is sent to the central processing unit. The two sets of data are compared to one another, and also to other data such as main gear speed, aircraft weight, area maps, GPS information etc. The added nose wheel speed and torque data help steering to be a precisely guided process.

Turns, among other things, require considerable oversteering of the nosegear, or steering of the nosegear along an invisible aircraft-specific line which considerably deviates from the centerline. With the data input of the present invention, the software may determine the rate and degree of the turn. The software could further postulate the position and direction of the aircraft if the wheel speeds are maintained for a certain time period.

For manual steering, it may be necessary to ensure that a pilot is driving slowly before a turn is attempted. It may also be necessary to stop a pilot from producing a differential that is too high. These ensure that the aircraft will remain properly balanced. It may also be useful to warn a pilot not to maintain the differential for too long, since the effect of the turn is only apparent significantly later, due to the great aircraft length. The output may be in the form of warnings, or over-riding a pilot's command, or re-setting the effective range of the pilot's command input device. In a simplified example, joystick position may represent regular incremental speed increases up to a top speed of 20 mph for forward taxi operations. Whenever the data compare indicates that the two wheels are turning at significantly different speeds, the guidance system may limit the top speed of the joystick to 10 mph. The incremental speed increases for each joystick position would be reduced.

For automatic steering, the data may be used in both the planning stage and for real time corrections to the plan, due to unforeseen eventualities. The planning stage includes determining a required aircraft speed as well as individual nose wheel torques. The collected data from the individual nose wheels enables greater precision.

3) The guidance system may use the data is to prevent skidding or tipping. During taxiing, it is important to ensure that all the wheels, including the main wheels and nose wheels, are all making proper contact with the ground. Awareness of the various wheel speeds can ensure that traction between each of the wheels and the ground is maintained.

In addition, the data collected may be used by the guidance system to warn against accidents, in which the aircraft is turning when it is not supposed to be. The data compare provides early awareness of a swerve due to a pothole or a ditch, or if the aircraft is overbalancing. In these cases, the data compare might output aa wider speed differential between the two wheels than is being commanded. Alternatively, during straight forward taxi, the data compare may output that the speed of one or both of the nose wheels is inconsistent with the aircraft speed determined by other sources. The data compare therefore indicates that one or both nose wheels are operating at an incorrect speed. This may indicate that traction is not being maintained. In response, either a predetermined corrective action may be applied, or the plane may be halted.

During manual taxi, it is necessary to prevent a pilot from turning the airplane too sharply. The method of the present invention involves: determining the speed differential between the two nose wheels, and comparing the speed differential with safe differential limits, and warning against or preventing the differential limits from being exceeded. This protects the aircraft from tipping.

4) In an aircraft, reversing is often a mandatory operating condition, needed for operations such as backing away from a gate, or when a pilot has overshot the beginning of the runway. However, other needs for reverse torque include steering, and also possibly to help to reduce speed after touchdown. In the case of applying a reverse torque to try to slow down the aircraft, the wheels would not actually turn in a reverse direction, (since a higher torque, from the speeding plane on the ground, is causing them to turn in a forwards direction) but the total aircraft speed may be reduced. The motor should therefore either be able to operate in reverse, or, alternatively, the motor operates in a forwards direction only, and an additional gear is used between the nose wheel motor and the nose wheel, solely to reverse the motor torque with respect to the nose wheels (similar to a reverse gear in a car, or alternatively, more complex). Data collectors attached to the nose wheel or the motors driving the nose wheel provide the guidance system with essential information for reversing operations.

5) In a further embodiment, the nose wheel motor or motors are used to pre-rotate the wheels of the aircraft prior to the aircraft landing. This significantly reduces the wear and tear on the motor wheels and tires and potentially produces gentler landings. The nose wheels may be pre-spun up to precisely match a calculated or estimated ground or landing speed. Alternatively, the nose wheels may be pre-spun to a speed lower than the expected landing speed, still with the benefit of reducing skidding, damage and wear on the wheels upon landing.

Data collectors supply the guidance system with information needed to determine the electrical power than must be applied to pre-rotate the wheels. Airspeed, aircraft speed, winds and weather may have varying effects on the degree to which the electrical motors rotate the wheels whilst airborne. Speed sensors to the nose wheels, or other forms of feedback from the motors themselves indicate the speed of the wheels. The guidance system sends a command to accelerate the wheel speed towards the expected ground or landing speed.

The motor or motors used in the nosegear, is preferably a high phase order motor, incorporating more than three different phases, with the benefit of positively harnessing many harmonics as useful torque and thereby using the motor windings weight more efficiently.

In a further aspect, a high phase order machine is mesh connected, so that varying the harmonic content of the drive waveform serves to vary the speed/torque relation of the machine.

In a further aspect, the nose wheel motor is a permanent magnet DC brushless machine, or any other rotating electrical machine. The motor may be equipped with gearing.

In a simplified aspect, only one of two nose wheels houses a motor, which drives both wheels. A limited slip differential could be included. One motor driving more than one wheel is less preferred because of the scuffing on the tires and general increase in tire wear.

Depending on operational requirements, the speed of one or both of the nose wheels is measured. The nose wheel speed is compared with other common data measurements such as aircraft weight, the main gear speed, and the nosegear steering position and the data is presented to the guidance system. The nosegear steering position may be set with the rudder pedals.

In a more complex aspect, additional more than two nose wheels may be provided, to enable multiple motors, housed within the nose wheels, to each contribute to the power output.

A further aspect of the present invention is described with reference again to FIG. 3. In this aspect, axle 7 is supported by strut 4 with bearings to allow rotation of axle 7 about its longitudinal horizontal axis. The motor or motors 8 (shown in FIG. 4) are affixed to the strut or are housed in the undercarriage of the aircraft. The motor is belted or otherwise mechanically connected to rotationally drive axle 7. Wheels 31 and 32 are connected to axle 7, so that as axle 7 rotates, so do wheels 31 and 32. This design is rather like a car axle. Gearing may interface between motor 8 and axle 7 or between axle 7 and wheel 31 and 32. The design enables a motor to not fit the dimensions of the wheel as it need not be housed in the wheel. High torques may put a lot of pressure on axle 7, particularly if the ground is uneven. However, the nosegear of the aircraft may be supplied with a shock strut that absorbs the shock that otherwise would be sustained by the airframe structure during takeoff, taxiing, and landing. Alternatively, bearings may be provided between axle 7 and wheels 31 and 32 to allow the wheel 31 and 32 a small degree of freedom to negotiate unevenness. At a minimum, only the motor speed or the speed of one of the nose wheels 31 or 32 needs to be measured and utilized. Differential mechanical braking may be used to steer the aircraft.

In a further aspect, a motor is located in one or more of the main gear wheels. Steering is done in the conventional way, using differential braking on the nose wheels. The present invention teaches the use of data collectors collecting speed and/or torque data from the nose wheels. One use of the data collectors is for an aircraft housing a motor for driving the main gear. The data collectors provide the precision and guidance purposes described above in other aspects of the invention.

The invention claimed is:

1. A drive system for an aircraft including two nosegear wheels and main gear wheels, comprising
   a. at least one onboard motor connected to at least one aircraft nosegear wheel or an aircraft main gear wheel for powering taxi operations of said aircraft;
   b. data collector means attached to said nosegear or a main gear for collecting data from said nosegear or main gear wheels or said at least one onboard motor relating to the operation of said wheels or said at least one onboard motor;
   c. data processor means for receiving and processing said data collected by said data collector means; and
   d. data compare means for comparing processed data from said data processor means and from sources other than said nosegear wheels or said at least one onboard motor, including said main gear wheels, wherein said compared data is used to control ground travel of said aircraft.

2. The drive system of claim 1, further including guidance system means for guiding operations selected from the group consisting of: automatic taxi, semi-automatic taxi, manual forward taxi, manual reverse taxi, manual steering taxi, dealing with uneven drive conditions, and pre-rotating wheels prior to landing based on said compared data.

3. The drive system of claim 1, wherein said data collector means comprises one or more sensors selected from the group consisting of speed sensors, torque sensors, and temperature sensors.

4. The drive system of claim 1, wherein said at least one onboard motor is mounted on an aircraft main gear wheel.

5. A method for controlling ground travel of an aircraft equipped with two nose wheels and an onboard motor located within each nose wheel to electrically power the nose wheel, said method comprising
   a. providing data collector means attached to said nose wheels and said motors for collecting data relating to the rotation of each said nose wheels and said onboard motors and collecting said data;
   b. providing data processor means to receive and process the collected data and receiving and processing the collected data;
   c. providing data compare means to compare the processed data with data from sources other than said nose wheels and said onboard motors and comparing the processed data with the data from other sources to compare between the rotational data of each nose wheel and onboard motor and determine the rate of change of the rotational data; and
   d. using the compared data to determine a desired speed or torque of the nose wheels or motors and driving the aircraft on the ground by electrically powering said onboard motors to move the nose wheels at the desired speed or torque.

6. A method for controlling ground travel of an aircraft equipped with two nose wheels and an onboard motor located within each nose wheel to electrically power the nose wheel, said method comprising
   a. providing data collector means for collecting data relating to the rotation of each said nose wheels and said onboard motors;
   b. providing data processor means to receive and process the collected data and receiving and processing the collected data;
   c. providing data compare means to compare the processed data with data from sources other than said nose wheels and said onboard motors and comparing the processed data with the data from other sources to compare between the rotational data of each nose wheel and onboard motor and determine the rate of change of the rotational data; and
   d. using the compared data to determine a desired speed or torque and driving the aircraft on the ground by electrically powering said onboard motors to move the nose wheels at the desired speed or torque, wherein said aircraft is steered during ground travel by providing a speed differential between the nose wheels.

7. The method of claim 6, wherein the speed differential between the nose wheels is provided by braking one of the nose wheels.

8. The method of claim 6, wherein said aircraft is driven on the ground in a forward direction or in a reverse direction, and said aircraft is driven in a reverse direction by applying a reversing gear between the onboard motor and the nose wheel or by supplying the onboard motor with electrical power to turn the nose wheel in a reverse direction.

9. The drive system of claim 1, wherein said at least one onboard motor is housed within the nosegear.

10. The drive system of claim 9, wherein said at least one onboard motor comprises an independently driven motor housed within each wheel of the nosegear.

11. The drive system of claim 10, wherein said data collector means comprises a data collector connected to the motor within each nosegear wheel for collecting data regarding rotational operation of the wheel by the measurement of motor characteristics, wherein said motor characteristics are selected from the group consisting of: motor speed, motor torque, motor temperature, and motor slip.

12. The drive system of claim 1 wherein said data collector is equipped to measure one or more of the variables selected from the group consisting of: wheel speed, wheel torque, wheel temperature, and gear ratio.

13. The drive system of claim 1 wherein said data processor means comprises a central processing unit and said sources other than said nosegear wheels or said onboard motor are selected from the group consisting of: main gear wheel measured speed, GPS, radar, radio transporters, airport maps, airport lighting, nose wheel steering position, main gear angle, aircraft weight, a speedometer measuring the rotational speed of the main gear, Laser Doppler velocimeters, aircraft position, video cameras, and airspeed.

14. The drive system of claim 13, wherein said at least one onboard motor comprises an independently driven motor housed within each wheel of the nosegear, said data collector means is attached to each wheel of the nosegear to collect rotational data from both wheels and said data compare means comprises means to compare between the rotational data of each nosegear wheel and means to determine the rate of change of the rotational data of each nosegear wheel.

15. The drive system of claim 2 wherein said guidance system means comprises means for guiding ground steering operations within defined safety parameters, wherein said ground steering operations are selected from the group consisting of: speed of aircraft during turns, angles of turns, and ground positioning of aircraft during turns.

16. The drive system of claim 2 wherein said guidance system means comprises an output selected from the group consisting of: automatic taxi, semi-automatic taxi, digital display, lights, audible warnings, pilot override, and resetting the range of a pilot input command unit.

17. The drive system of claim 1 wherein said at least one motor-comprises a high phase order motor.

18. The drive system of claim 1 wherein said at least one motor is connected to rotationally drive an axle between two nose wheels, and wherein said axle is connected to drive the two nose wheels.

19. The drive system of claim 1, wherein said at least one motor is housed in a nosegear wheel and said drive system further includes gearing connecting said at least one motor and the nosegear wheels.

20. The method of claim 6, wherein providing a speed differential between the nose wheels comprises reducing the speed of one of the motors.

21. The method of claim 6 wherein providing a speed differential between the nose wheels comprises reducing a speed of one of the motors and simultaneously increasing a speed of the other of the motors to maintain a steady aircraft speed throughout whilst steering.

22. The method of claim 6, wherein providing a speed differential between the nose wheels comprises providing a differential between speed/torque ratios of the motors.

23. The method of claim 22 wherein providing a differential between the speed/torque ratios of the motors comprises varying the harmonic content of the drive waveform of a mesh connected high phase order motor.

24. The method of claim 6, further comprising comparing speeds of the nose wheels during taxi with commanded nose wheel speeds and with a speed of the aircraft deduced from other sources, and if said comparison indicates that either nose wheel is operating at an incorrect speed, applying a corrective action or halting the aircraft.

25. The method of claim 6, further comprising determining a speed differential between the two nose wheels, comparing the speed differential with safe differential limits, and warning against or preventing the differential limits from being exceeded, thereby protecting the aircraft from tipping.

* * * * *